United States Patent
Imadu et al.

(10) Patent No.: US 11,352,676 B2
(45) Date of Patent: Jun. 7, 2022

(54) MACHINE COMPONENT

(71) Applicant: KOMATSU LTD., Tokyo (JP)

(72) Inventors: Yusuke Imadu, Tokyo (JP); Toshiyuki Iseki, Tokyo (JP); Takaaki Sasaki, Tokyo (JP); Motomi Mizugai, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/289,000

(22) PCT Filed: Jan. 23, 2020

(86) PCT No.: PCT/JP2020/002403
§ 371 (c)(1),
(2) Date: Apr. 27, 2021

(87) PCT Pub. No.: WO2020/158582
PCT Pub. Date: Aug. 6, 2020

(65) Prior Publication Data
US 2021/0404027 A1 Dec. 30, 2021

(30) Foreign Application Priority Data
Jan. 31, 2019 (JP) .............................. JP2019-016173

(51) Int. Cl.
*F16H 57/08* (2006.01)
*C21D 5/00* (2006.01)
*C21D 1/18* (2006.01)

(52) U.S. Cl.
CPC ................ *C21D 5/00* (2013.01); *C21D 1/18* (2013.01); *F16H 57/082* (2013.01)

(58) Field of Classification Search
CPC ............ C21D 5/00; C21D 1/18; F16H 57/082
See application file for complete search history.

(56) References Cited

U.S. PATENT DOCUMENTS

2002/0179205 A1* 12/2002 Ohbayashi ............... C21D 1/10
148/586

FOREIGN PATENT DOCUMENTS

| JP | H04-113786 U | 10/1992 |
|---|---|---|
| JP | H07-035849 U | 7/1995 |
| JP | 2004-018882 A | 1/2004 |
| JP | 2004-019676 A | 1/2004 |
| JP | 2004018882 A * | 1/2004 |
| JP | 2012077539 A * | 4/2012 |
| JP | 2015-077830 A | 4/2015 |
| JP | 2019-100510 A | 6/2019 |
| JP | 2020-122200 A | 8/2020 |

* cited by examiner

*Primary Examiner* — Richard W Ridley
*Assistant Examiner* — Aimee Tran Nguyen
(74) *Attorney, Agent, or Firm* — Oliff PLC

(57) ABSTRACT

A machine component, made of steel or cast iron and having a circular hole that opens in a first surface, includes a plurality of first quench-hardened regions that include the first surface and are arranged apart from each other along a first circle surrounding the hole when viewed in a plane in a direction perpendicular to the first surface, and a base region that is a region other than the first quench-hardened regions.

13 Claims, 6 Drawing Sheets

MACHINE COMPONENT

TECHNICAL FIELD

The present invention relates to a machine component.

This application claims priority based on Japanese Patent Application No. 2019-016173 filed on Jan. 31, 2019, the entire contents of which are incorporated herein by reference.

BACKGROUND ART

An axle device of a work machine includes a planetary gear mechanism. A carrier of the planetary gear mechanism has a hole formed therein for inserting a pin that supports a planetary gear (see, for example, Japanese Patent Application Laid-Open No. 2015-77830 (Patent Literature 1)).

CITATION LIST

Patent Literature

Patent Literature 1: Japanese Patent Application Laid-Open No. 2015-77830

SUMMARY OF INVENTION

Technical Problem

High wear resistance is required for a region facing the planetary gear on a carrier surface surrounding the outer edge of the above-described hole of the carrier. In order to improve the wear resistance of this region, it is conceivable to form an annular quench-hardened region in the region. As such, in a machine component made of steel or cast iron and having a hole that opens in the surface, an annular quench-hardened region including the surface and surrounding the outer edge of the hole may be formed.

Forming the annular quench-hardened region as described above, however, leads to a decreased dimensional accuracy of the hole. Accordingly, one of the objects of the present invention is to suppress a decrease in dimensional accuracy of a hole in a machine component made of steel or cast iron, which has the hole that opens in a surface and has a quench-hardened region formed to include the surface and surround an outer edge of the hole.

Solution to Problem

A machine component according to the present invention is a machine component made of steel or cast iron and having a circular hole that opens in a first surface. The machine component includes a plurality of first quench-hardened regions, which include the first surface and are arranged apart from each other along a first circle surrounding the hole when viewed in a plane in a direction perpendicular to the first surface, and a base region that is a region other than the first quench-hardened regions.

Effects of the Invention

According to the machine component described above, it is possible to suppress the decrease in dimensional accuracy of the hole.

DESCRIPTION OF EMBODIMENTS

Outline of Embodiments

Figure 1:
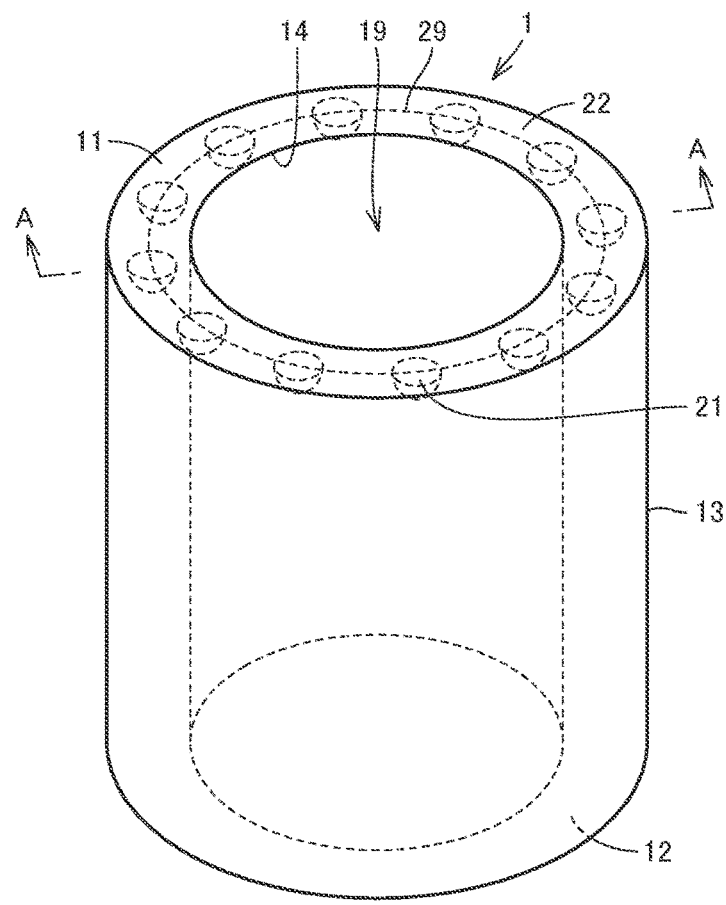
FIG. 1 is a schematic perspective view showing the structure of a machine component in Embodiment 1.

The machine component of the present application is a machine component made of steel or cast iron and having a circular hole that opens in a first surface (a hole that opens in the first surface and has a circular shape when viewed in a plane in a direction perpendicular to the first surface). The machine component includes a plurality of first quench-hardened regions, which include the first surface and are arranged apart from each other along a first circle surrounding the hole when viewed in a plane in a direction perpendicular to the first surface, and a base region that is a region other than the first quench-hardened regions.

When a quench-hardened region is formed, the region expands due to the phase transformation of the material. Forming an annular quench-hardened region to surround the outer edge of the hole as described above leads to a decreased dimensional accuracy of the hole because of the decrease in the diameter of the hole attributable to the increase in the volume.

In contrast, in the machine component of the present application, a plurality of first quench-hardened regions are arranged apart from each other along a first circle surrounding the hole. Placing the plurality of first quench-hardened regions apart from each other along the first circle in this manner suppresses the decrease in the diameter attributable to the increase in the volume. This is conceivably because there is a non-quench-hardened region between the first quench-hardened regions adjacent to each other in the circumferential direction of the first circle. As a result, according to the machine component of the present application, it is possible to suppress the decrease in the dimensional accuracy of the hole.

In the machine component described above, the plurality of first quench-hardened regions may be arranged apart from an outer edge of the hole when viewed in a plane in the direction perpendicular to the first surface. In this manner, it is possible to further suppress the decrease in the dimensional accuracy of the hole.

In the machine component described above, the plurality of first quench-hardened regions may be arranged at equal intervals with each other in the circumferential direction of the first circle when viewed in a plane in the direction perpendicular to the first surface. Arranging the first quench-hardened regions evenly in the circumferential direction in this manner can further suppress the decrease in the dimensional accuracy of the hole.

In the machine component described above, the first quench-hardened regions may each have a circular outer shape when viewed in a plane in the direction perpendicular to the first surface. Making the planar shape of the first quench-hardened regions highly symmetric in this manner can further suppress the decrease in the dimensional accuracy of the hole.

In the machine component described above, the adjacent first quench-hardened regions may be arranged apart from each other by at least 80% of a diameter of the first quench-hardened regions when viewed in a plane in the direction perpendicular to the first surface. In a region including the boundary between the first quench-hardened region and the base region, residual stress exists attributable to the phase transformation caused by quenching. If the regions suffering the residual stress of the adjacent first quench-hardened regions overlap each other, the dimensional accuracy of the hole will decrease. Arranging the adjacent first quench-hardened regions apart from each other by at least 80% of the diameter of the first quench-hardened regions suppresses the overlapping of the regions suffering the residual stress of the adjacent first quench-hardened regions. This can further suppress the decrease in the dimensional accuracy of the hole.

The machine component described above may further include a plurality of second quench-hardened regions that include the first surface and are arranged apart from each other along a second circle when viewed in a plane in the direction perpendicular to the first surface, the second circle having a center that coincides with a center of the first circle and having a larger diameter than the first circle. Arranging a plurality of rows of the quench-hardened regions in this manner facilitates improving the wear resistance of the first surface.

In the machine component described above, the plurality of second quench-hardened regions may be arranged apart from the outer edge of the hole when viewed in a plane in the direction perpendicular to the first surface. In this manner, it is possible to further suppress the decrease in the dimensional accuracy of the hole.

In the machine component described above, the plurality of second quench-hardened regions may be arranged at equal intervals with each other in a circumferential direction of the second circle when viewed in a plane in the direction perpendicular to the first surface. Arranging the second quench-hardened regions evenly in the circumferential direction in this manner can further suppress the decrease in the dimensional accuracy of the hole.

In the machine component described above, the second quench-hardened regions may each have a circular outer shape when viewed in a plane in the direction perpendicular to the first surface. Making the planar shape of the second quench-hardened regions highly symmetric in this manner can further suppress the decrease in the dimensional accuracy of the hole.

In the machine component described above, the second quench-hardened regions and the first quench-hardened regions may be arranged apart from each other. In this manner, it is possible to further suppress the decrease in the dimensional accuracy of the hole.

In the machine component described above, when viewed in a plane in the direction perpendicular to the first surface, the first quench-hardened regions and the second quench-hardened regions may have circular outer shapes. The adjacent first and second quench-hardened regions may be arranged apart from each other by at least 80% of a diameter of the first and second quench-hardened regions. In this manner, it is possible to prevent the region suffering the residual stress of the first quench-hardened region and the region suffering the residual stress of the adjacent second quench-hardened region from overlapping each other, thereby further suppressing the decrease in the dimensional accuracy of the hole.

It should be noted that the state where the adjacent first and second quench-hardened regions are arranged apart from each other by at least 80% of a diameter of the first and second quench-hardened regions means the state where the first and second quench-hardened regions adjacent to each other are separated by at least 80% of the diameter of the first quench-hardened region and by at least 80% of the diameter of the second quench-hardened region. That is, when the diameter of the first quench-hardened region differs from that of the second quench-hardened region, the first quench-hardened region and the second quench-hardened region may be arranged adjacent to each other at a distance of at least 80% of the larger diameter.

In the machine component described above, when viewed in a plane in the direction perpendicular to the first surface, the adjacent first and second quench-hardened regions may have their centroids not overlapping each other when viewed in a radial direction from the center of the first circle. Such a configuration facilitates improving the wear resistance of the first surface.

The machine component described above may be a carrier of a planetary gear mechanism. The hole may be a hole into which a pin is inserted for supporting a planetary gear disposed in the carrier. The first surface may be a surface that faces the planetary gear. The machine component of the present application is suitable as a carrier for a planetary gear mechanism.

SPECIFIC EXAMPLES OF EMBODIMENTS

Embodiments of the machine component of the present invention will be described below with reference to the drawings. In the following drawings, the same or corresponding parts are denoted by the same reference numerals, and the description thereof will not be repeated.

Embodiment 1

Figure 2:
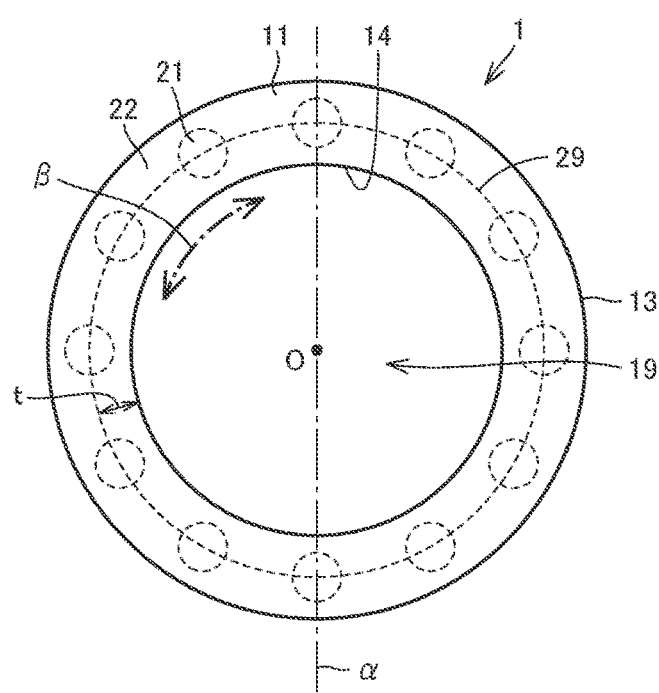
FIG. 2 is a schematic plan view showing the structure of the machine component in Embodiment 1.
Figure 3:
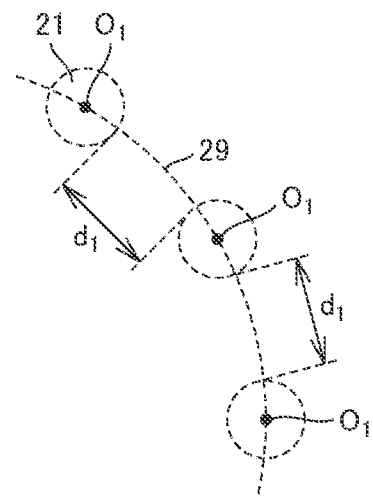
FIG. 3 is a schematic plan view showing the arrangement of first quench-hardened regions.
Figure 4:
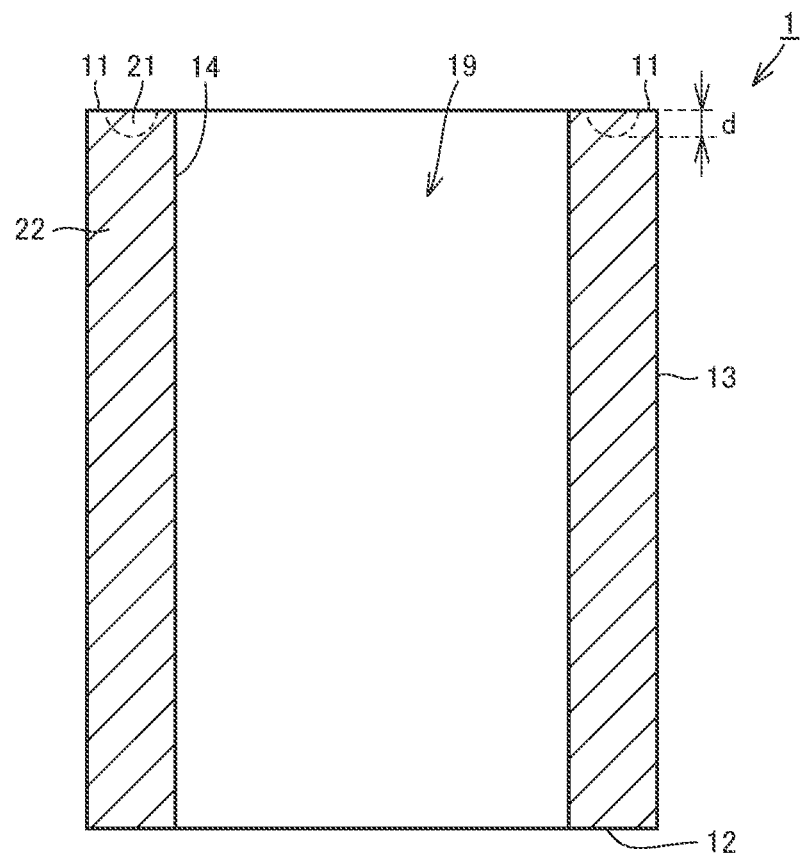
FIG. 4 is a schematic cross-sectional view showing the structure of the machine component in Embodiment 1.

Firstly, a machine component in Embodiment 1 will be described with reference to FIGS. 1 to 4. FIG. 1 is a schematic perspective view showing the structure of a machine component. FIG. 2 is a schematic plan view showing the structure of the machine component as viewed from a first end face side. FIG. 3 is a schematic plan view showing the arrangement of first quench-hardened regions. FIG. 4 is a schematic cross-sectional view taken along the line segment A-A in FIG. 1.

Referring to FIGS. 1 and 2, the machine component 1 in the present embodiment has a hollow cylindrical shape, with a hole 19 formed to penetrate in a central axis direction so as to include the central axis. The machine component 1 is made of steel or cast iron. The machine component 1 includes a first end face 11 which is one end face as a first surface, a second end face 12 which is the other end face, an outer peripheral surface 13, and an inner peripheral surface 14. Referring to FIG. 2, the hole 19 is circular when viewed from a direction perpendicular to the first end face 11. The outer peripheral surface 13 and the inner peripheral surface 14 are circular when viewed from the direction perpendicular to the first end face 11. When viewed from the direction perpendicular to the first end face 11, the centers of the hole 19, the outer peripheral surface 13, and the inner peripheral surface 14 coincide with each other. The first end face 11 and the second end face 12 have a ring shape.

The hole 19 opens in the first end face 11 as the first surface. The machine component 1 includes a plurality of first quench-hardened regions 21 that include the first end face 11 and are arranged apart from each other along a first circle 29 surrounding the hole 19 when viewed in a plane in the direction perpendicular to the first end face 11, and a base region 22 that is a region other than the first quench-hardened regions 21. The base region 22 is present between a pair of adjacent first quench-hardened regions 21 when viewed in a plane in the direction perpendicular to the first end face 11. Referring to FIGS. 2 and 3, the first quench-hardened regions 21 of the present embodiment each have a circular outer shape with a center $O_1$ when viewed in a plane in the direction perpendicular to the first end face 11. Referring to FIG. 2, the center O of the hole 19 coincides with the center of the first circle 29 when viewed in a plane in the direction perpendicular to the first end face 11.

Referring to FIGS. 1 and 4, a cross section of a first quench-hardened region 21 parallel to the first end face 11 has the cross-sectional area that decreases with increasing distance from the first end face 11 in the direction perpendicular to the first end face 11. Referring to FIG. 4, the first quench-hardened region 21 has a maximum distance (maximum depth) d from the first end face 11. The depth of the first quench-hardened region 21 increases with increasing distance from the outer peripheral surface 13 to the maximum value (depth d), and then decreases as it approaches the inner peripheral surface 14. The first quench-hardened region 21 has a convex shape toward the second end face 12. In the present embodiment, all of the first quench-hardened regions 21 have the same shape. The depth d is 0.1 mm or more, for example, from the standpoint of ensuring sufficient wear resistance. The depth d is, for example, 1.5 mm or less.

The first quench-hardened regions 21 are arranged apart from an outer edge of the hole 19 (the inner peripheral surface 14) when viewed in a plane in the direction perpendicular to the first end face 11. The first quench-hardened regions 21 are arranged apart from the outer peripheral surface 13 when viewed in a plane in the direction perpendicular to the first end face 11. That is, the first quench-hardened regions 21 are not exposed to the inner peripheral surface 14. The first quench-hardened regions 21 are not exposed to the outer peripheral surface 13.

The plurality of first quench-hardened regions 21 are arranged at equal intervals with each other in a circumferential direction of the first circle 29 (the direction along the arrow β, which is the circumferential direction of the outer edge of the hole 19) when viewed in a plane in the direction perpendicular to the first end face 11. Referring to FIG. 3, the adjacent first quench-hardened regions 21 are all separated by a distance $d_1$ when viewed in a plane in the direction perpendicular to the first end face 11 (or, in the first end face 11). The distance $d_1$ is at least 80% of the diameter of the first quench-hardened regions 21.

In the machine component 1 of the present embodiment, a plurality of first quench-hardened regions 21 are arranged apart from each other along the first circle 29 surrounding the hole 19. Arranging the plurality of first quench-hardened regions 21 apart from each other along the first circle 29 in this manner suppresses the decrease in the diameter of the hole 19 associated with the increase in the volume attributable to the phase transformation caused by quenching. As a result, the machine component of the present embodiment is a machine component in which the decrease in the dimensional accuracy of the hole 19 is suppressed.

Figure 5:
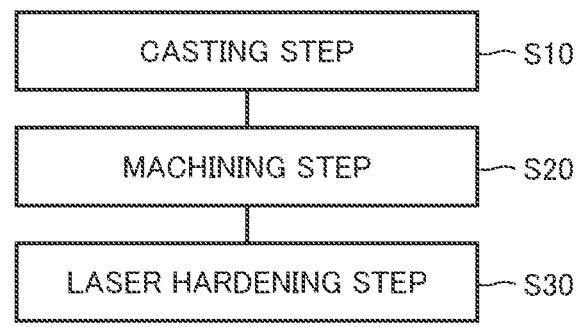
FIG. 5 is a flowchart schematically illustrating a method of producing a machine component in Embodiment 1.

An exemplary method of producing the machine component 1 of the present embodiment will now be described. FIG. 5 is a flowchart schematically illustrating a method of producing a machine component 1. Referring to FIG. 5, in the method of producing the machine component 1 of the present embodiment, a casting step is firstly performed as a step S10. In the step S10, cast iron in a molten state having an appropriate component composition, for example, is poured into a mold having a cavity corresponding to a desired shape of the machine component 1, and solidifies. Instead of cast iron in a molten state, steel in a molten state, such as carbon steel for machine structural use or alloy steel for machine structural use in a molten state, for example, may be poured into the mold. The resultant solidified machine component 1 is then removed from the mold.

Next, a machining step is performed as a step S20. In the step S20, the machine component 1 obtained in the step S10 is subjected to machining. Specifically, machining such as cutting, turning, etc. is performed on the machine component 1 to obtain the machine component 1 having a shape of the finished state.

Next, a laser hardening step is performed as a step S30. In the step S30, the machine component 1 having the shape of the finished state, obtained in the step S20, is subjected to laser hardening. As the laser used for laser hardening, a carbon dioxide gas laser, a YAG laser, a semiconductor laser, or a fiber laser, for example, may be adopted. Specifically, referring to FIGS. 1 and 2, the first end face 11 of the machine component 1 prior to formation of first quench-hardened regions 21, obtained in the step S20, is irradiated with a laser. The irradiated laser beam has a spot shape on the first end face 11 that corresponds to a desired shape of the first quench-hardened region 21. For forming a first quench-hardened region 21, the steel or cast iron constituting the machine component is heated by laser irradiation to a temperature equal to or higher than the $A_1$ transformation point, and then rapidly cooled as the laser irradiation region moves. In this manner, the first quench-hardened regions 21 are formed sequentially in the circumferential direction. As a result, a plurality of first quench-hardened regions 21, arranged side by side apart from each other along the first circle 29, are formed so as to surround the hole 19.

Thereafter, the machine component 1 is completed through rust-proofing, painting, or other processes as required. After the step S30, no processing is performed for improving the dimensional accuracy of the hole 19, such as turning, grinding or other finishing processing, or sizing processing. The machine component 1 of the present embodiment can be produced with the above-described procedure.

Embodiment 2

Figure 6:
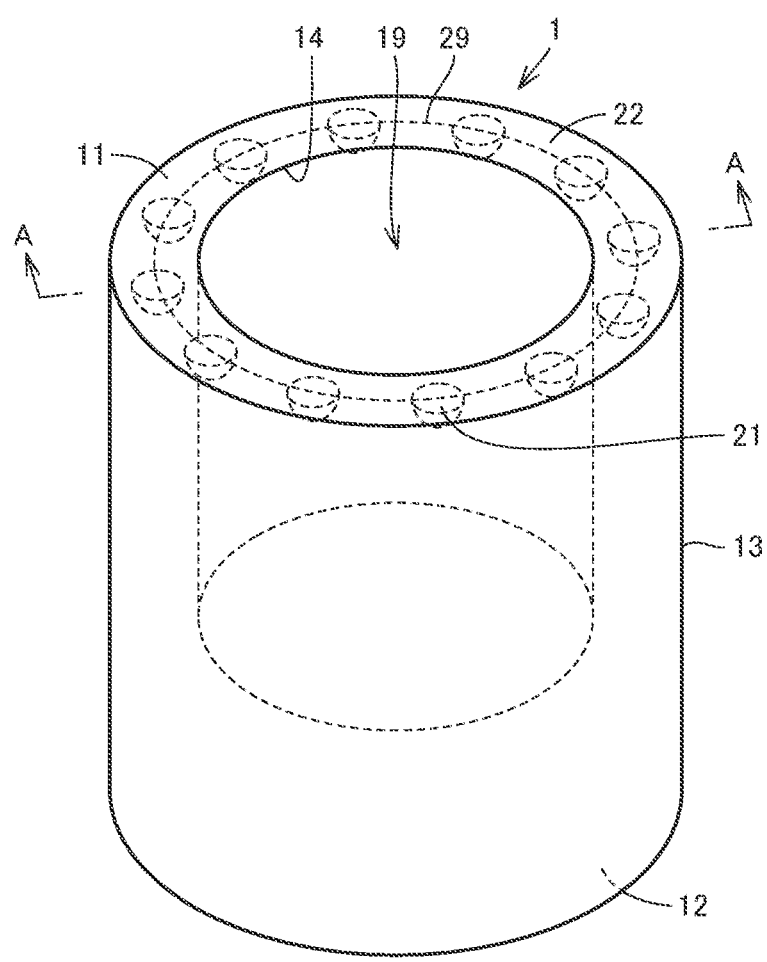
FIG. 6 is a schematic perspective view showing the structure of a machine component in Embodiment 2.

FIG. 6 is a schematic perspective view showing the structure of a machine component in Embodiment 2. FIG. 6 corresponds to FIG. 1 in Embodiment 1. Referring to FIG. 6, the machine component 1 in Embodiment 2 basically has a similar structure and produces similar effects as the machine component 1 of Embodiment 1. However, the machine component 1 in Embodiment 2 differs from that in Embodiment 1 in the shape of the hole 19.

Referring to FIG. 6, the hole 19 of the machine component 1 in the present embodiment is not a through hole but a hole with a bottom. The machine component 1 has a bottom surface defining the hole 19. In the machine component 1 of the present embodiment as well, a plurality of first quench-hardened regions 21 are arranged apart from each other along a first circle 29 surrounding the hole 19. This suppresses the decrease in the diameter of the hole 19 associated with the increase in the volume attributable to the phase transformation caused by quenching. As a result, the machine component of the present embodiment is a machine component in which the decrease in the dimensional accuracy of the hole 19 is suppressed.

Embodiment 3

Figure 7:
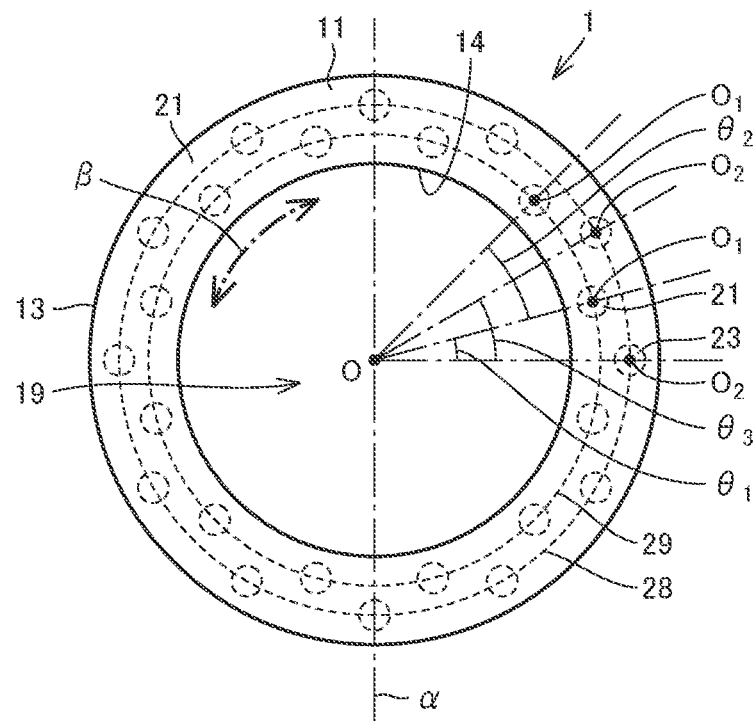
FIG. 7 is a schematic plan view showing the structure of a machine component in Embodiment 3.
Figure 8:
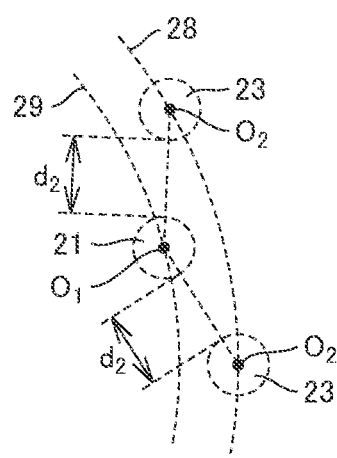
FIG. 8 is a schematic plan view showing the arrangement of first quench-hardened regions and second quench-hardened regions in Embodiment 3.

FIG. 7 is a schematic plan view showing the structure of a machine component in Embodiment 3. FIG. 7 corresponds to FIG. 2 in Embodiment 1. FIG. 8 is a schematic plan view showing the arrangement of first quench-hardened regions and second quench-hardened regions in Embodiment 3. FIG. 8 corresponds to FIG. 3 in Embodiment 1. Referring to FIGS. 7 and 8, the machine component 1 in Embodiment 3 basically has a similar structure and produces similar effects as the machine component 1 of Embodiment 1. However, the machine component 1 in Embodiment 3 differs from that in Embodiment 1 in that second quench-hardened regions 23 are formed.

Referring to FIGS. 7 and 8, the machine component 1 in Embodiment 3 includes a plurality of second quench-hardened regions 23 that include the first end face 11 and are arranged apart from each other along a second circle 28, having a center that coincides with the center of the first circle 29 and having a larger diameter than the first circle 29, when viewed in a plane in the direction perpendicular to the first end face 11. A base region 22 is present between a pair of adjacent second quench-hardened regions 23 when viewed in a plane in the direction perpendicular to the first end face 11. The second quench-hardened regions 23 of the present embodiment each have a circular outer shape with a center $O_2$ when viewed in a plane in the direction perpendicular to the first end face 11. Referring to FIG. 7, the center O of the hole 19 coincides with the center of the first circle 29 when viewed in a plane in the direction perpendicular to the first end face 11.

In the present embodiment, the shape and size of the second quench-hardened regions 23 are the same as those of the first quench-hardened regions 21 described in Embodiment 1 above. The second quench-hardened regions 23 each have a circular outer shape when viewed in a plane in the direction perpendicular to the first end face 11. The second quench-hardened regions 23 and the first quench-hardened regions 21 are arranged apart from each other.

The second quench-hardened regions 23 are arranged apart from the outer edge of the hole 19 (the inner peripheral surface 14) when viewed in a plane in the direction perpendicular to the first end face 11. The second quench-hardened regions 23 are arranged apart from the outer peripheral surface 13 when viewed in a plane in the direction perpendicular to the first end face 11. That is, the second quench-hardened regions 23 are not exposed to the inner peripheral surface 14. The second quench-hardened regions 23 are not exposed to the outer peripheral surface 13. The first quench-hardened regions 21 and the second quench-hardened regions 23 are alternately arranged in the circumferential direction (the direction along the arrow β).

When viewed in a plane in the direction perpendicular to the first end face 11, the plurality of second quench-hardened regions 23 are arranged at equal intervals with each other in a circumferential direction of the second circle 28 (the direction along the arrow β, which is the circumferential direction of the outer edge of the hole 19). Referring to FIG. 8, when viewed in a plane in the direction perpendicular to the first end face 11 (or, in the first end face 11), the first quench-hardened region 21 and the second quench-hardened region 23 adjacent to each other are separated by a distance $d_2$. The distance $d_2$ is at least 80% of a diameter of the first quench-hardened region 21 and the second quench-hardened region 23.

Referring to FIG. 7, when viewed in a plane in the direction perpendicular to the first end face 11, the centroid (center $O_1$) of the first quench-hardened region 21 and the centroid (center $O_2$) of the adjacent second quench-hardened region do not overlap when viewed in a radial direction (the direction along the straight line α) from the center of the first circle 29. More specifically, a central angle $\theta_1$ corresponding to the center $O_1$ of the first quench-hardened region 21 and the center $O_2$ of the adjacent second quench-hardened region (the angle between a straight line passing through the center $O_1$ of the first quench-hardened region 21 and the center O of the hole 19 and a straight line passing through the center $O_2$ of the second quench-hardened region 23 and the center O of the hole 19) is 15°±30', for example, and preferably 15°±15'. A central angle $\theta_2$ corresponding to the centers $O_1$ of the adjacent first quench-hardened regions 21 is 30°±30', for example. A central angle $\theta_3$ corresponding to the centers $O_2$ of the adjacent second quench-hardened regions 23 is 30°±30', for example.

In the machine component 1 of Embodiment 3, a plurality of rows of quench-hardened regions (the first quench-hardened regions 21 and the second quench-hardened regions 23) are arranged side by side. This facilitates improving the wear resistance of the first end face 11. The second quench-hardened regions 23 can be formed in a similar manner as the first quench-hardened regions 21.

Embodiment 4

Figure 9:
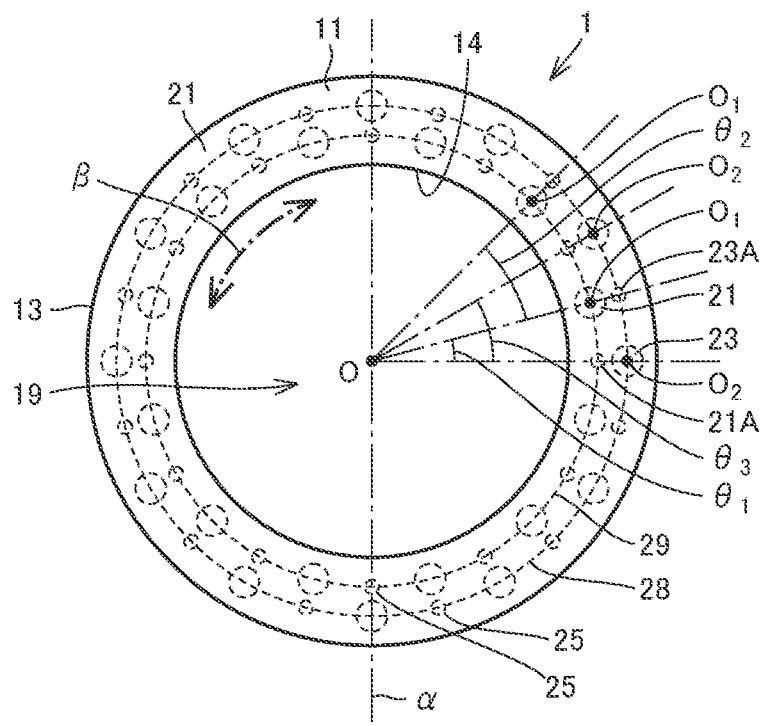
FIG. 9 is a schematic plan view showing the structure of a machine component in Embodiment 4.

FIG. 9 is a schematic plan view showing the structure of a machine component in Embodiment 4. FIG. 9 corresponds to FIG. 7 in Embodiment 3. Referring to FIGS. 9 and 7, the machine component 1 in Embodiment 4 basically has a similar structure and produces similar effects as the machine component 1 of Embodiment 3. However, the machine component 1 in Embodiment 4 differs from that in Embodiment 3 in that it includes third quench-hardened regions 25.

Referring to FIG. 9, the machine component 1 of Embodiment 4 further includes a third quench-hardened region 25 between the adjacent first quench-hardened regions 21 in a direction along the first circle 29. A plurality of third quench-hardened regions 25 are arranged at equal intervals so as to fall on the first circle 29. The machine component 1 of Embodiment 4 further includes a third quench-hardened region 25 between the adjacent second quench-hardened regions 23 in a direction along the second circle 28. A plurality of third quench-hardened regions 25 are arranged at equal intervals so as to fall on the second circle 28. The third quench-hardened region 25 has a shape similar to and reduced from that of the first quench-hardened region 21, for example. The third quench-hardened regions 25 each have a circular outer shape when viewed in a plane in the direction perpendicular to the first end face 11 (or, in the first end face 11).

The third quench-hardened regions 25 are arranged so as not to overlap either the first quench-hardened regions 21 or the second quench-hardened regions 23. In the direction along the first circle 29, a third quench-hardened region 25 is arranged to fall on a straight line passing through the center O of the hole 19 and the center $O_1$ of the first quench-hardened region 21. In the direction along the second circle 28, a third quench-hardened region 25 is arranged to fall on a straight line passing through the center O of the hole 19 and the center $O_2$ of the second quench-hardened region 23. The first quench-hardened regions 21 and the third quench-hardened regions 25 are alternately arranged along the first circle 29. The second quench-hardened regions 23 and the third quench-hardened regions 25 are alternately arranged along the second circle 28.

The machine component 1 of the present embodiment further includes the third quench-hardened regions 25 as described above. With this, it is possible to increase the ratio of the quench-hardened regions (the first quench-hardened regions 21, the second quench-hardened regions 23, and the third quench-hardened regions 25) to the first end face 11. As a result, the machine component 1 of the present embodiment is a machine component in which the wear resistance of the first end face 11 can be improved with ease.

Embodiment 5

Figure 10:
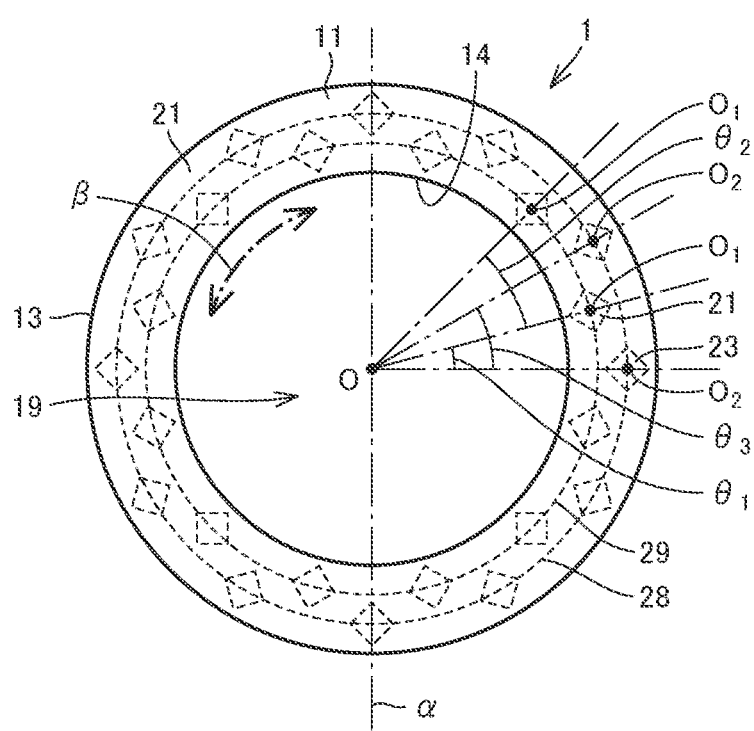
FIG. 10 is a schematic plan view showing the structure of a machine component in Embodiment 5.

FIG. 10 is a schematic plan view showing the structure of a machine component in Embodiment 5. FIG. 10 corresponds to FIG. 7 in Embodiment 3. Referring to FIGS. 10 and 7, the machine component 1 in Embodiment 5 basically has a similar structure and produces similar effects as the machine component 1 of Embodiment 3. However, the machine component 1 in Embodiment 5 differs from that in Embodiment 3 in the shape of the first quench-hardened regions 21.

Referring to FIG. 10, first quench-hardened regions 21 and second quench-hardened regions 23 of the present embodiment have a square shape when viewed in a plane in the direction perpendicular to the first end face 11 (or, in the first end face 11). A straight line passing through the center O of the hole 19 and the centroid $O_1$ of a first quench-hardened region 21 passes through a pair of opposite vertices of the first quench-hardened region 21 of the square shape. A straight line passing through the center O of the hole 19 and the centroid $O_2$ of a second quench-hardened region 23 passes through a pair of opposite vertices of the second quench-hardened region 23 of the square shape.

Thus, even when a shape other than a circular shape is adopted as the shape of the first quench-hardened regions 21 and the second quench-hardened regions 23 in the first end face 11, the similar effects as those of Embodiments 1 to 4 described above can be obtained.

It should be noted that the arrangement and shapes of the first quench-hardened regions 21, the second quench-hardened regions 23, and the third quench-hardened regions 25 in Embodiments 1 to 5 described above may be combined as appropriate. While circular and square shapes have been illustrated as the outer shape of the quench-hardened regions in the first end face 11, the shape of the quench-hardened regions is not limited thereto, and any shape can be adopted. However, from the standpoint of facilitating the improvement in the dimensional accuracy of the hole 19, the shape of the quench-hardened regions is preferably a highly symmetrical shape, such as a circle or a regular polygon. Further, from the standpoint of improving the wear resistance of the first end face 11, it is preferable that the ratio of the quench-hardened regions (the first quench-hardened regions 21, the second quench-hardened regions 23, and the third quench-hardened regions 25) to the first end face 11 is 3% or more. The ratio of the quench-hardened regions (the first quench-hardened regions 21, the second quench-hardened regions 23, and the third quench-hardened regions 25) to the first end face 11 is more preferably 8% or more.

Further, in Embodiments 1 to 5 described above, as an example of the case where the quench-hardened regions (the first quench-hardened regions 21, the second quench-hardened regions 23, and the third quench-hardened regions 25) are arranged side by side along the first circle 29 or the second circle 28 when viewed in a plane in a direction perpendicular to the first end face 11 (or, in the first end face 11), a case in which the centroid (center) of each quench-hardened region is positioned on the first circle 29 or the second circle 28 has been described. However, the quench-hardened regions do not necessarily have to be arranged strictly in a circle as above. The centroid (center) of each quench-hardened region may be at a short distance from the first circle 29 or the second circle 28. In Embodiments 1 to 5 described above, the case where all the quench-hardened regions (the first quench-hardened regions 21, the second quench-hardened regions 23, and the third quench-hardened regions 25) are arranged along the first circle 29 or the second circle 28 has been described. Alternatively, some of the plurality of quench-hardened regions may be arranged in positions not along either the first circle 29 or the second circle 28.

Embodiment 6

Figure 11:
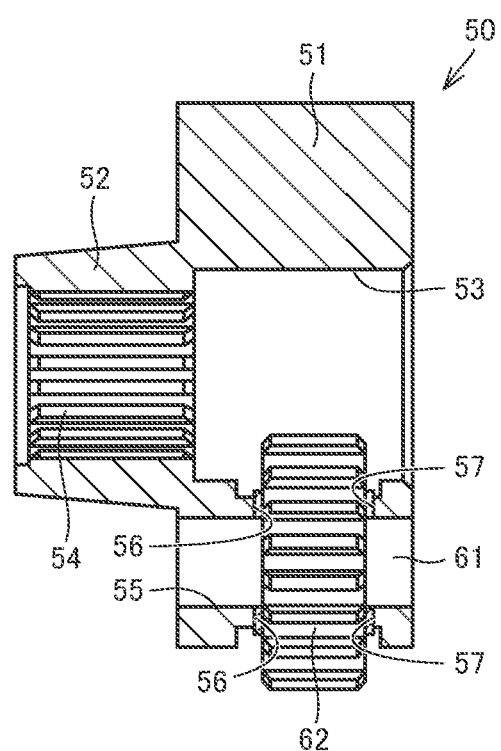
FIG. 11 is a schematic cross-sectional view showing the structure of a carrier of a planetary gear mechanism.

An example of applying the machine component of the present application to a carrier of a planetary gear mechanism will now be described as Embodiment 6. FIG. 11 is a schematic cross-sectional view showing the structure of a carrier of a planetary gear mechanism. Referring to FIG. 11, the carrier 50 of a planetary gear mechanism, which is the machine component in the present embodiment, includes a large diameter section 51 having a cylindrical shape, and a small diameter section 52 having a cylindrical shape with an outer diameter smaller than that of the large diameter section 51 and connected to the large diameter section 51 in an axial direction. A first through hole 53 is formed to include central axes of the large diameter section 51 and the small diameter section 52 and to penetrate the large diameter section 51 and the small diameter section 52 in the axial direction. A region of the small diameter section 52 that surrounds the first through hole 53 is a spline portion 54 having spline grooves formed on the wall surface. The spline portion 54 engages an axle shaft (not shown).

On the outer peripheral side of the first through hole 53 of the large diameter section 51, a second through hole 55 is formed to penetrate the large diameter section 51 in the axial direction. A pin 61 inserted into the second through hole 55 supports a planetary gear 62 with respect to the carrier 50. More specifically, the planetary gear 62 is circumferentially rotatably supported with respect to the pin 61 with a bearing (not shown) interposed between the outer peripheral surface of the pin 61 and the inner peripheral surface of the planetary gear 62. A raceway ring of the bearing comes into contact with carrier thrust surfaces 56 and 57, which are regions of the surface of the carrier 50 that each include the outer edge of the second through hole 55 and face the planetary gear 62. The carrier thrust surfaces 56 and 67 thus require wear resistance. For this reason, in the carrier 50 of the present embodiment, the quench-hardened regions (the first quench-hardened regions 21, the second quench-hardened regions 23, and the third quench-hardened regions 25) described in Embodiments 1 to 5 above are formed so as to include the carrier thrust surfaces 56 and 57.

Each carrier thrust surface 56, 57 corresponds to the first surface of the machine component in the present application. The second through hole 55 is the hole that opens in the carrier thrust surface 56, 57 as the first surface. The carrier 50, as in the case of the machine component 1 described above, includes: a plurality of first quench-hardened regions 21 including the carrier thrust surface 56, 57 as the first surface and arranged apart from each other along a first circle 29 surrounding the second through hole 55 when viewed in a plane in a direction perpendicular to the carrier thrust surface 56, 57; and a base region 22 that is a region other than the first quench-hardened regions 21. The carrier 50 may further include a plurality of second quench-hardened regions 23 arranged apart from each other along a second circle 28. The carrier 50 may further include a plurality of third quench-hardened regions 25 arranged apart from each other along the first circle 29 and along the second circle 28.

In the carrier 50 as the machine component of the present embodiment as well, a decrease in the diameter of the second through hole 55 (corresponding to the hole 19) associated with an increase in the volume attributable to the phase transformation caused by quenching is suppressed, as in the above-described embodiments. The machine component of the present embodiment is accordingly a machine component in which the decrease in the dimensional accuracy of the second through hole 55 is suppressed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: machine component; 11: first end face; 12: second end face; 13: outer peripheral surface; 14: inner peripheral surface; 19: hole; 21: first quench-hardened region; 22: base region; 23: second quench-hardened region; 25: third quench-hardened region; 28: second circle; 29: first circle; 50: carrier; 51: large diameter section; 52: small diameter section; 53: first through hole; 54: spline portion; 55: second through hole; 56, 57: carrier thrust surface; 61: pin; and 62: planetary gear.

The invention claimed is:

1. A machine component made of steel or cast iron and having a circular hole that opens in a first surface, comprising:
   a plurality of first quench-hardened regions including the first surface and arranged apart from each other along a first circle surrounding the hole when viewed in a plane in a direction perpendicular to the first surface; and
   a base region that is a region other than the first quench-hardened regions, wherein
   the machine component is a carrier of a planetary gear mechanism,
   the hole is a hole into which a pin is inserted for supporting a planetary gear disposed in the carrier, and
   the first surface is a surface that faces the planetary gear.

2. The machine component according to claim 1, wherein the plurality of first quench-hardened regions are arranged apart from an outer edge of the hole when viewed in a plane in the direction perpendicular to the first surface.

3. The machine component according to claim 1, wherein the plurality of first quench-hardened regions are arranged at equal intervals with each other in a circumferential direction of the first circle when viewed in a plane in the direction perpendicular to the first surface.

4. The machine component according to claim 1, wherein the first quench-hardened regions each have a circular outer shape when viewed in a plane in the direction perpendicular to the first surface.

5. The machine component according to claim 4, wherein the adjacent first quench-hardened regions are arranged apart from each other by at least 80% of a diameter of the first quench-hardened regions when viewed in a plane in the direction perpendicular to the first surface.

6. The machine component according to claim 1, further comprising a plurality of second quench-hardened regions including the first surface and arranged apart from each other along a second circle when viewed in a plane in the direction perpendicular to the first surface, the second circle having a center that coincides with a center of the first circle and having a larger diameter than the first circle.

7. The machine component according to claim 6, wherein the plurality of second quench-hardened regions are arranged apart from an outer edge of the hole when viewed in a plane in the direction perpendicular to the first surface.

8. The machine component according to claim 6, wherein the plurality of second quench-hardened regions are arranged at equal intervals with each other in a circumferential direction of the second circle when viewed in a plane in the direction perpendicular to the first surface.

9. The machine component according to claim 6, wherein the second quench-hardened regions each have a circular outer shape when viewed in a plane in the direction perpendicular to the first surface.

10. The machine component according to claim 6, wherein the second quench-hardened regions and the first quench-hardened regions are arranged apart from each other.

11. The machine component according to claim 6, wherein when viewed in a plane in the direction perpendicular to the first surface,
    the first quench-hardened regions and the second quench-hardened regions have circular outer shapes, and
    the adjacent first and second quench-hardened regions are arranged apart from each other by at least 80% of a diameter of the first and second quench-hardened regions.

12. The machine component according to claim 6, wherein when viewed in a plane in the direction perpendicular to the first surface, the adjacent first and second quench-hardened regions have their centroids not overlapping each other when viewed in a radial direction from the center of the first circle.

13. A machine component made of steel or cast iron and having a circular hole that opens in a first surface, comprising:
    a plurality of first quench-hardened regions including the first surface and arranged apart from each other along a first circle surrounding the hole when viewed in a plane in a direction perpendicular to the first surface; and
    a base region that is a region other than the first quench-hardened regions, wherein
    the machine component is a carrier of a planetary gear mechanism, the hole is a hole into which a pin is inserted for supporting a planetary gear disposed in the carrier,
the first surface is a surface that faces the planetary gear,
when viewed in a plane in the direction perpendicular to the first surface,
the plurality of first quench-hardened regions are arranged apart from an outer edge of the hole,
the plurality of first quench-hardened regions are arranged at equal intervals with each other in a circumferential direction of the first circle,
the first quench-hardened regions each have a circular outer shape, and
the adjacent first quench-hardened regions are arranged apart from each other by at least 80% of a diameter of the first quench-hardened regions.

\* \* \* \* \*